United States Patent
Carbonell et al.

(10) Patent No.: US 9,807,048 B2
(45) Date of Patent: Oct. 31, 2017

(54) PROVIDING TARGETED MESSAGES VIA A SOCIAL MEDIA SYSTEM WHILE CONCEALING TIES TO THE MESSAGE SOURCE

(71) Applicant: International Business Machines Corporation, Armonk, NY (US)

(72) Inventors: Lee A. Carbonell, Flower Mound, TX (US); Tsz S. Cheng, Grand Prairie, TX (US); Jeffrey L. Edgington, Keller, TX (US); Pandian Mariadoss, Allen, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 630 days.

(21) Appl. No.: 13/776,958

(22) Filed: Feb. 26, 2013

(65) Prior Publication Data
US 2014/0245182 A1    Aug. 28, 2014

(51) Int. Cl.
*H04L 12/58* (2006.01)
*G06F 3/048* (2013.01)
*G06F 17/30* (2006.01)

(52) U.S. Cl.
CPC ............. *H04L 51/32* (2013.01); *G06F 3/048* (2013.01); *G06F 17/30014* (2013.01)

(58) Field of Classification Search
CPC ......... H04L 51/32; H04L 12/58; G06F 3/048; G06F 17/30014
See application file for complete search history.

(56) References Cited

U.S. PATENT DOCUMENTS

| | | | | |
|---|---|---|---|---|
| 6,738,808 B1* | 5/2004 | Zellner | ............... | H04L 63/0281 342/357.52 |
| 7,188,358 B1* | 3/2007 | Hisada | ............... | H04L 51/12 709/223 |
| 7,246,150 B1* | 7/2007 | Donoho | ............... | G06F 17/30867 707/E17.109 |
| 7,356,490 B1* | 4/2008 | Jacobi | ............... | G06F 17/30867 705/26.8 |
| 7,444,297 B2 | 10/2008 | Shah | | |
| 8,195,529 B1* | 6/2012 | Cohen et al. | ............... | 705/27.1 |

(Continued)

*Primary Examiner* — Amy M Levy
(74) *Attorney, Agent, or Firm* — Cuenot, Forsythe & Kim, LLC

(57) ABSTRACT

A method for electronically providing targeted messages can begin when a source-concealing targeted messaging system receives data items provided by a source user that define a targeted message that is to be presented within a social media context. The data items can include a set of recipients, a message body, and a set of trigger conditions indicating when the targeted message is to be presented to the recipients. The recipients can be members of a contact list of the source user within the social media system providing the social media context. Satisfaction of the trigger conditions can be monitored and the social media system can be monitored recipients. When the trigger conditions are satisfied and a recipient is currently using the social media system, the targeted message can be presented within a user interface of the social media system, such that the source user appears unaffiliated with the targeted message.

14 Claims, 4 Drawing Sheets

(56) References Cited

U.S. PATENT DOCUMENTS

| | | | |
|---|---|---|---|
| 8,965,964 B1* | 2/2015 | Odell | H04L 51/046 709/204 |
| 2002/0143664 A1* | 10/2002 | Webb | G06Q 10/109 705/14.5 |
| 2003/0154135 A1* | 8/2003 | Covington | G06Q 30/00 705/26.8 |
| 2003/0172005 A1* | 9/2003 | Hellal | G06Q 30/02 705/14.51 |
| 2006/0136419 A1* | 6/2006 | Brydon | G06Q 10/107 |
| 2007/0136122 A1* | 6/2007 | Diederiks | G06Q 30/02 705/14.4 |
| 2007/0169202 A1* | 7/2007 | Goldberg | G06F 21/31 726/26 |
| 2007/0274489 A1* | 11/2007 | Yamamura | H04M 3/42008 379/201.1 |
| 2008/0045236 A1* | 2/2008 | Nahon | H04W 4/12 455/456.1 |
| 2008/0228597 A1 | 9/2008 | Sondles | |
| 2009/0092139 A1* | 4/2009 | Coley | H04L 65/605 370/395.4 |
| 2009/0327437 A1* | 12/2009 | Estrada | H04L 12/587 709/206 |
| 2010/0023338 A1 | 1/2010 | Petronelli et al. | |
| 2010/0030638 A1* | 2/2010 | Davis, III | G06Q 30/02 705/14.43 |
| 2011/0004939 A1* | 1/2011 | Cohen | G06F 21/00 726/26 |
| 2011/0107427 A1* | 5/2011 | Cohen | H04L 63/0861 726/26 |
| 2011/0154020 A1* | 6/2011 | Cohen | G06F 21/10 713/153 |
| 2011/0191417 A1* | 8/2011 | Rathod | G06Q 30/02 709/204 |
| 2011/0252011 A1* | 10/2011 | Morris | H04L 12/185 707/706 |
| 2012/0072304 A1* | 3/2012 | Homan | G06Q 30/0633 705/26.8 |
| 2012/0078731 A1* | 3/2012 | Linevsky | G06Q 30/0277 705/14.73 |
| 2012/0136725 A1* | 5/2012 | Alexander | G06Q 30/02 705/14.66 |
| 2012/0150598 A1* | 6/2012 | Griggs | G06Q 30/06 705/14.16 |
| 2013/0085823 A1* | 4/2013 | Gibson | G06Q 30/02 705/14.5 |
| 2013/0097251 A1* | 4/2013 | Stibel | G06Q 30/0255 709/206 |
| 2013/0097254 A1* | 4/2013 | Appelman et al. | 709/206 |
| 2013/0138477 A1* | 5/2013 | Wilkins | G06Q 30/0207 705/7.31 |
| 2013/0191251 A1* | 7/2013 | Martin | G06Q 30/0601 705/26.61 |
| 2013/0283388 A1* | 10/2013 | Ashok | G06F 21/60 726/26 |
| 2013/0283401 A1* | 10/2013 | Pabla et al. | 726/30 |
| 2013/0290172 A1* | 10/2013 | Mashinsky | G06Q 20/12 705/39 |
| 2013/0311327 A1* | 11/2013 | Tehrani | G06Q 30/02 705/26.8 |
| 2014/0059658 A1* | 2/2014 | Stecher | G06F 21/45 726/5 |

\* cited by examiner

US 9,807,048 B2

PROVIDING TARGETED MESSAGES VIA A SOCIAL MEDIA SYSTEM WHILE CONCEALING TIES TO THE MESSAGE SOURCE

BACKGROUND

The present invention relates to the field of targeted messaging and, more particularly, to providing targeted messages via a social media system while concealing ties to the message source.

It is often a socially awkward experience when one receives undesired gifts. First, the gift-receiver must appear to be excited about receiving the gift, so as to not offend the giver. Then, the receiver must decide how to handle the undesired gift; each resolution having different levels of potential social backlash or embarrassment. To avoid these situations, many people try to provide friends and family members with veiled hints as to the gifts they would like to receive for an upcoming holiday or celebration.

While it is socially-acceptable to provide gift-givers with a list of desired gift items for momentous occasions (e.g., weddings and offspring expectance), doing so for more common celebrations (e.g., birthday, anniversary, Valentine's Day, etc.) is typically viewed negatively. The proliferation of online shopping and social media is lessening this negativity; however, it is still difficult to overcome the perceived social stigma. For example, many online shopping Web sites allow a user to create a "Wish List" of items they desire, which the user is able to share directly and/or indirectly with other people. Even though the user is not present when others view their "Wish List", the user often still experiences the ingrained social awkwardness that gifts are given and not requested.

Thus, the conundrum of social awkwardness of dealing with undesired gifts and of suggesting desired items to gift-givers continues to plague many people. People often resort to providing gift-givers with verbal or physical (e.g., notes, pictures, etc.) clues regarding desired gift items. However, it is often obvious as to whom the clues originated.

BRIEF SUMMARY

One aspect of the present invention can include a method for electronically providing targeted messages. Such a method can begin when a source-concealing targeted messaging system receives data items that define a targeted message that is to be presented within a social media context. The data items can be provided by a source user of the source-concealing targeted messaging system. The data items can include a set of recipients, a message body, and a set of trigger conditions indicating when the targeted message is to be presented to the recipients. The source user and the set of recipients can be members of a social media system providing the social media context. The recipients can be members of a contact list of the source user within the social media system. The trigger conditions of the targeted message can be monitored for satisfaction and the social media system can be monitored for the presence of the recipients. When the trigger conditions are satisfied and a recipient is currently active within the social media system, the message body of the targeted message can be presented to the recipient within a user interface of the social media system. The affiliation of the source user with the targeted message can be concealed from the recipient in the presentation.

Another aspect of the present invention can include a system for electronically providing targeted messages. Such a system can include a social media system having a user interface and a source-concealing targeted messaging system. The source-concealing targeted messaging system can be configured to utilize the social media system as a delivery vehicle to present a targeted message created by a source user to a set of recipients. The source user and the set of recipients can be members of the social media system. The set of recipients can be members of a contact list of the source user within the social media system. An affiliation of the source user with the targeted message can be concealed from the set of recipients when the targeted message is presented.

Yet another aspect of the present invention can include a computer program product that includes a computer readable storage medium having embedded computer usable program code. The computer usable program code can be configured to receive data items that define a targeted message that is to be presented within a social media context. The data items can be provided by a source user. The data items can comprise a set of recipients, a message body, and a set of trigger conditions indicating when the targeted message is to be presented to the set of recipients. The source user and the set of recipients can be members of a social media system providing the social media context. The set of recipients can be members of a contact list of the source user within the social media system. The computer usable program code can be configured to monitor the trigger conditions of the targeted message for satisfaction and the social media system for the presence of the set of recipients. The computer usable program code can be configured to, when the trigger conditions are satisfied and a recipient is currently active within the social media system, present the message body of the targeted message to the recipient within a user interface of the social media system. An affiliation of the source user with the targeted message can be concealed from the recipient in the presentation.

DETAILED DESCRIPTION

Figure 1:
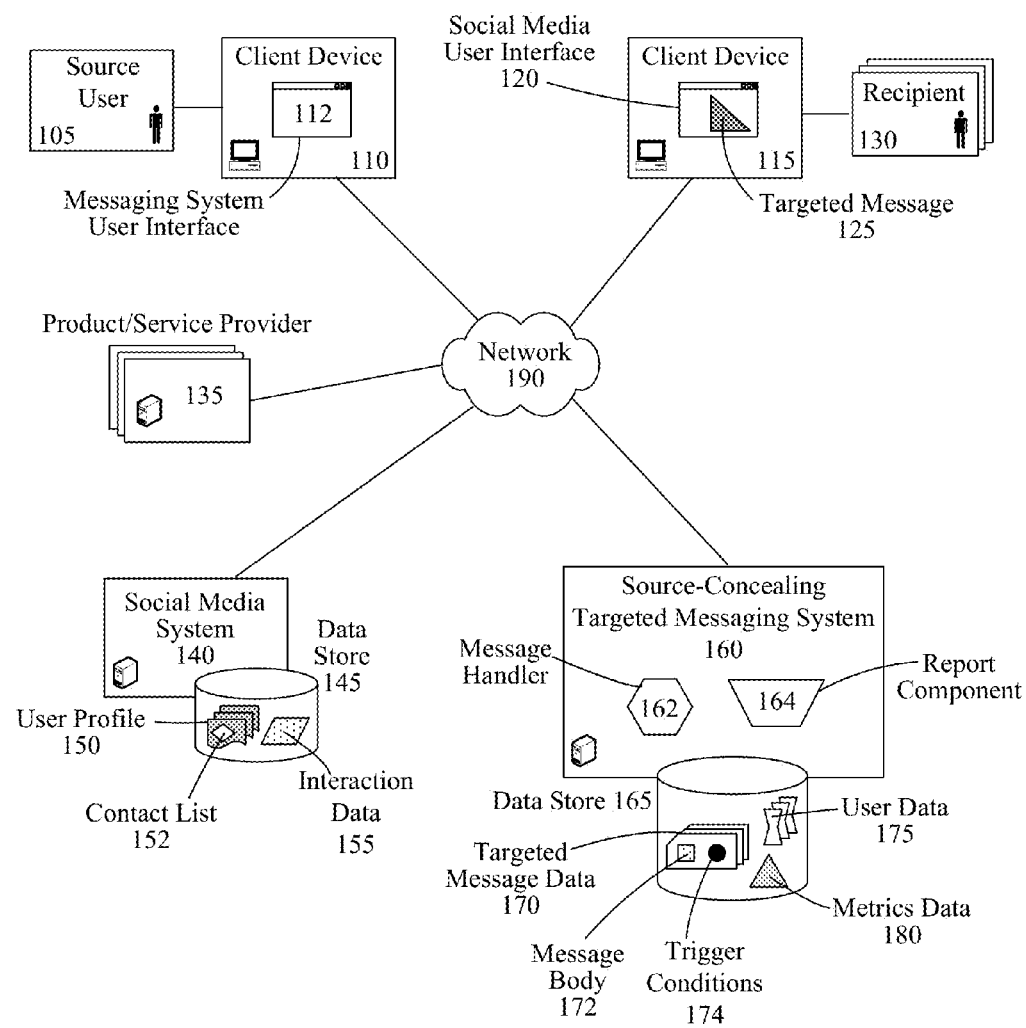
FIG. 1 is a schematic diagram illustrating a system that utilizes a source-concealing targeted messaging system to provide targeted messages within the user interface of a social media system while concealing ties to the source user who created the targeted message in accordance with embodiments of the inventive arrangements disclosed herein.

The present invention discloses a solution for electronically providing targeted messages to recipients in a social media context without revealing the source of the targeted message. A source user can create a targeted message using a source-concealing targeted messaging system. The targeted message can include a social media system to be used as the delivery vehicle, a set of recipients, a set of trigger conditions, and a message body. The set of recipients can be members of the source user's contact list within the social media system. When the trigger conditions are met and a recipient is currently active in the social media system, the source-concealing targeted messaging system can provide the social media system with the message body for presentation within the user interface of the social media system. The targeted message can be presented within the user interface of the social media system in such a manner that an affiliation to the source user is not revealed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that utilizes a source-concealing targeted messaging system 160 to provide targeted messages 125 within the user interface 120 of a social media system 140 while concealing ties to the source user 105 who created the targeted message 125 in accordance with embodiments of the inventive arrangements disclosed herein. In system 100, the source user 105 can create a targeted message 125 for future presentation to one or more recipients 130 within a social media user interface 120.

The source user 105 can be an individual, a group of individuals, or a corporate entity that registers with the source-concealing targeted messaging system 160, herein referred to as the targeted messaging system 160. The source user 105 can be a registered member of one or more social media systems 140. The recipients 130 of the targeted message 125 can also be members of the social media systems 140 and contained in the corresponding contact list 152 of the source user 105. While it is possible for a recipient 130 to represent a group of people or corporate entity, a recipient 130 can most likely be an individual known by the source user 105 (e.g., family member, friend, coworker, acquaintance, etc.).

The source user 105 can create the targeted message 125 and designate recipients 130 using a user interface 112 of the targeted messaging system 160 running on a client device 110. The client device 110 can represent a variety of electronic or computing devices capable of supporting operation of the messaging system user interface 112 and communicating with the targeted messaging system 160 over a network 190. The messaging system user interface 112 can be the means by which the source user 105 can interact with the targeted messaging system 160.

The targeted messaging system 160 can represent the hardware and/or software components required to present a targeted message 125 to a recipient 130 within the user interface 120 of a social media system 140. The concept of targeted messaging is well known in the art, particularly with respect to advertisements. Conventional implementations of targeted messaging can be based upon individual and/or interaction data 155 collected by the social media system 140 to influence the advertisements, which are a type of targeted message 125, presented to the user in the user interface 120.

Social media systems 140 are well known in the art, and, as such, only functionality directly related to the present disclosure will be discussed herein. The social media system 140 can be the hardware and/or software components required to exchange data amongst a social network. The social media system 140 can capture information about its members in user profiles 150 as well as actions taken by the members within the social network as interaction data 155; storing the user profiles 150 and interaction data 155 in an accessible data store 145. A user profile 150 can include a contact list 152 that defines connections and/or relationships of a user to other users of the social media system 140.

The social media system 140 can have a user interface 120 for facilitating user 105 and 130 interactions. The social media user interface 120 can be configured to operate upon a variety of applicable client devices 115. Further, the social media user interface 120 can include a visual area for displaying the targeted message 125.

The targeted messaging system 160 of the present disclosure, however, provides the means by which the source user 105 can create the targeted message 125 and control when and to whom (e.g., the recipients 130) the targeted message 125 is presented. Further, the targeted messaging system 160 can present the targeted message 125 to the recipients 130 without explicitly indicating that the source user 105 sent the targeted message 125.

For example, the targeted messaging system 160 can be thought of as an electronic means of dropping hints to friends and family as to what gifts the source user 105 would like to receive for their birthday or other upcoming holiday. Instead of attempting to leave verbal and/or physical clues for gift-givers (recipients 130) to decipher, the source user 105 can use the targeted messaging system 160 as an intermediary that appears to have gift ideas that would please the source user 105.

Various online stores can offer the source user 105 with the ability to place desired items in a shopping cart or on a "Wish List", and requires the source user 105 to explicitly share the information with the recipients 130 or the recipients 130 to be aware of the information and seek it out. Often, explicitly requesting gifts on the part of the source user 105 can have a negative social connotation and is frowned upon. The targeted messaging system 160 can provide an acceptable alternative for sharing this type of information in a setting (the social media system 140) that is known to utilize targeted advertisements without the source user 105 receiving negative social feedback.

The targeted messaging system 160 can include a message handler 162, a report component 164, and a data store 165 containing targeted message data 170, user data 175, and metrics data 180. The source user 105 can be required to register with the targeted messaging system 160; the collected registration information can be stored as user data 175. Recipients 130 of the targeted message 125, however, need not be registered members of the targeted messaging system 160, only the social media system 140.

The message handler 162 can be the component of the targeted messaging system 160 that performs functions related to targeted messages 125, such as creation, management, and delivery functions. The message handler 162 can be configured to interact with the messaging system user interface 112 for creation and management of the source user's 105 targeted messages 125. When the source user 105 creates a targeted message 125, the targeted message 125 can be stored within data store 165 as targeted message data 170 until delivered to the recipient 130.

The targeted message data 170 can include the message body 172 and trigger conditions 174 for the targeted message 125. The message body 172 can represent the information (text, audio, video, graphics, etc.) that is visually presented to the recipient 130. Information contained in the message body 172 can be provided by the source user 105 and/or a product/service provider 135, as is common in conventional targeted advertisements. A product/service provider 135 can represent an entity that offers information about or the sales of a product and/or service in an online setting.

For example, the source user 105 can desire a t-shirt that is only sold on a specific online store 135. The message body 172 of the targeted message 125 created by the source user 105 can include a hyperlink to the Web page of the online store 135 featuring the t-shirt. As an alternate example, the message body 172 can contain a hyperlink that, when clicked upon by a recipient 130, would display the "Wish List" of the source user 105 for a particular online shopping site 135.

The targeted message data 170 can also include trigger conditions 174 that define when and how the message body 172 is delivered to the designated recipients 130 as a targeted message 125. The scope of the trigger conditions 174 can be dependent upon the specific implementation of the targeted messaging system 160 as well as the capabilities of the social media system 140 being used as the delivery vehicle of the targeted message 125.

Delivery of the targeted message 125 can require the message handler 162 to interface with the social media system 140 using appropriate communications pathways, protocols, and/or application programming interfaces (APIs). The message handler 162 can monitor the social media system 140 to determine when a recipient 130 of a targeted message 125 is online. If the trigger conditions 174 for the targeted message 125 are satisfied, the message handler 162 can provide the social media system 140 with the message body 172, which can be presented as the targeted message 125 within the social media user interface 120.

Interaction with the targeted message 125 by the recipient 130 can be collected by the social media system 140 as interaction data 155 and aggregated by the report component 164 as metrics data 180. The report component 164 can utilize the metrics data 180 to produce a variety of reports that can be utilized by the source user 105, social media system 140, product/service providers 135, and/or administrator of the targeted messaging system 160.

The reports generated by the report component 164 can indicate information like how often recipients 130 purchase the item indicated in the targeted message 125, whether a recipient 130 purchases more than the indicated item, how often the recipients 130 viewed information contained in the targeted message 125, and so on. The reports can be run at predetermined time intervals or upon request via the messaging system user interface 112. In another contemplated embodiment, the product/service providers 135 can utilize the messaging system user interface 112 to access the reports created by the report component 164.

In an alternate embodiment, the targeted messaging system 160 can be an integrated or plug-in component of the social media system 140.

It should be noted that promoting desired gifts can be just one of many applications of the targeted messaging system 160. Targeted messages 125 can be used by a small business (source user 105) to promote business specials or sales to recipients 130 who are in their contact list 152 on the social media system 140; giving increased value to being a member of the contact list 152. Alternately, targeted messages 125 can be used by a source user 105 to promote organizations and/or causes within their social media network without incurring potential social backlash.

For example, in conventional social media systems 140, the source user 105 would post a message that is viewable by all or a subset of their contact list 152. Everyone who views the posted message knows that the message came from the source user 105, who may receive unpleasant feedback from those in the contact list 152 that are in disagreement. Using the targeted messaging system 160, the source user 105 can share the targeted message 125 with members of the contact list 152 and the recipients 130 need not be aware that the targeted message 125 came from the source user 105. Thus, the source user 105 can feel happy that they shared the opinion or information that they desired without receiving argumentative feedback that can be upsetting.

In another embodiment, the product/service providers 135 can be required to register with or be vetted by the targeted messaging system 160. Further, a service fee can be associated with such registration.

In another contemplated embodiment, a source user 105 can receive rewards from product/service providers 135 in response to sales or other activities that were precipitated by the source user's 105 targeted message 125.

Such a level of confidentiality on the part of the source user 105 can have the potential to encourage use of the targeted messaging system 160 for hostile or provocative targeted messages 125. However, this potential can be considered to be equal to the potential already present in existing communication systems. The targeted messaging system 160 can be configured to check the content of the message body 172 during creation of the targeted message 125 to disallow hostile or inflammatory text. Alternately, the targeted messaging system 160 could be configured such that the source user 105 can only create the message body 172 from a predefined set of sentences or phrases.

As used herein, presented data stores 145 and 165 can be a physical or virtual storage space configured to store digital information. Data stores 145 and 165 can be physically implemented within any type of hardware including, but not limited to, a magnetic disk, an optical disk, a semiconductor memory, a digitally encoded plastic memory, a holographic memory, or any other recording medium. Data stores 145 and 165 can be a stand-alone storage unit as well as a storage unit formed from a plurality of physical devices. Additionally, information can be stored within data stores 145 and 165 in a variety of manners. For example, information can be stored within a database structure or can be stored within one or more files of a file storage system, where each file may or may not be indexed for information searching purposes. Further, data stores 145 and/or 165 can utilize one or more encryption mechanisms to protect stored information from unauthorized access.

Network 190 can include any hardware/software/and firmware necessary to convey data encoded within carrier waves. Data can be contained within analog or digital signals and conveyed though data or voice channels. Network 190 can include local components and data pathways necessary for communications to be exchanged among computing device components and between integrated device components and peripheral devices. Network 190 can also include network equipment, such as routers, data lines, hubs, and intermediary servers which together form a data network, such as the Internet. Network 190 can also include circuit-based communication components and mobile communication components, such as telephony switches, modems, cellular communication towers, and the like. Network 190 can include line based and/or wireless communication pathways.

Figure 2:
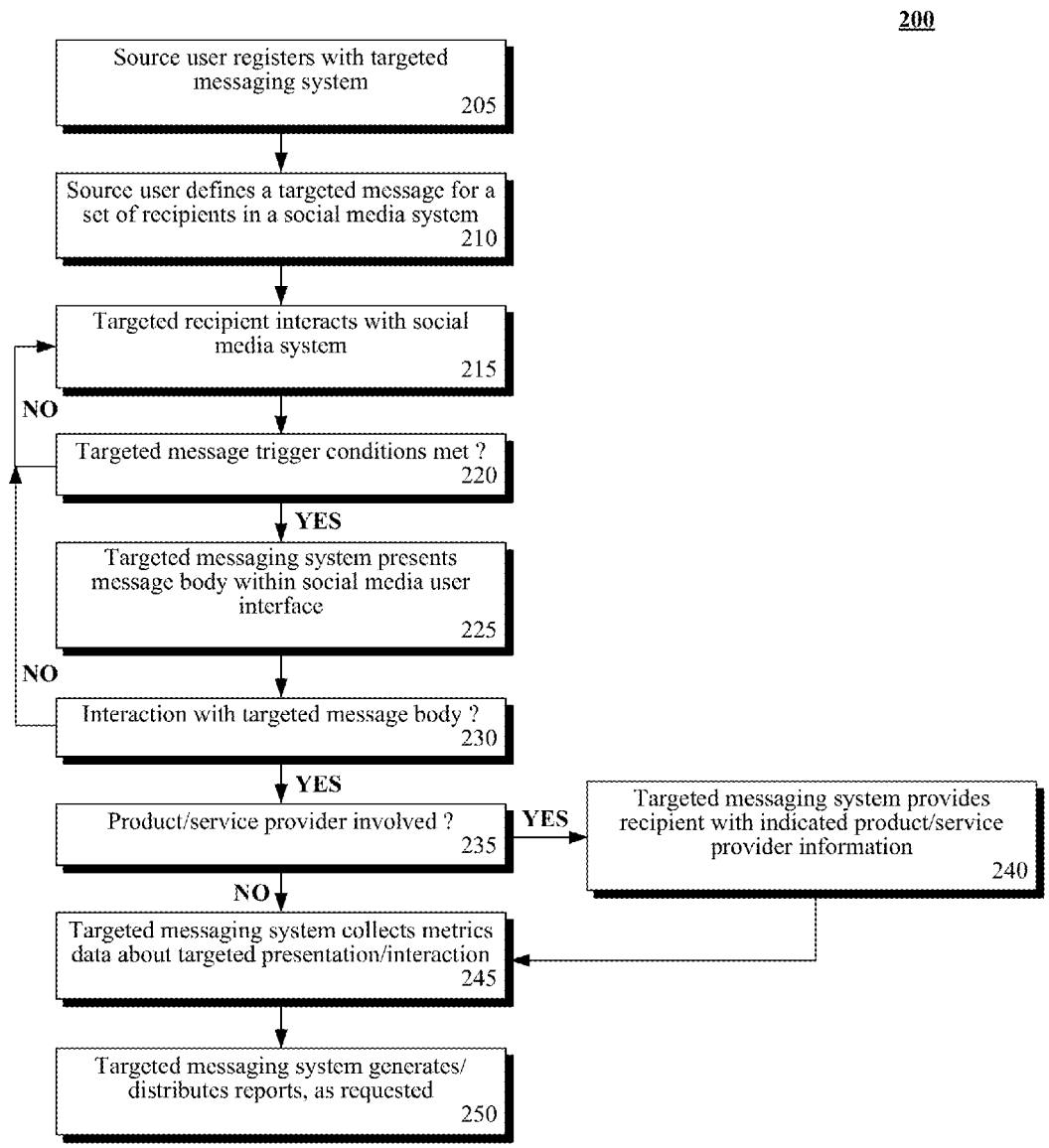
FIG. 2 is a flowchart of a method expressing the general interactions involved in a system that utilizes the targeted messaging system in accordance with an embodiment of the inventive arrangements disclosed herein.

FIG. 2 is a flowchart of a method 200 expressing the general interactions involved in a system that utilizes the targeted messaging system in accordance with embodiments of the inventive arrangements disclosed herein. Method 200 can be performed within the context of system 100.

Method 200 can begin in step 205 where the source user can register with the targeted messaging system. The source user can define a targeted message for a set of recipients in a social media system in step 210. In step 215, a recipient of the targeted message can interact with the social media system.

The targeted messaging system can determine if the trigger conditions of the targeted message have been met in step 220. When the trigger conditions of the targeted message have not been met, flow of method 200 can return to step 215 to continue monitoring recipients and/or the social media system.

When the trigger conditions of the targeted message have been met, step 225 can be performed where the targeted messaging system can present the message body of the targeted message within the appropriate space of the social media user interface. Step 225 can include communications between the targeted messaging system and the social media system to provide the social media system with the targeted message, which is then presented within the user interface by the social media system.

In step 230, the targeted messaging system can determine if the recipient has interacted with the targeted message body like clicking an included hyperlink. Step 230 can encompass the interaction data being collected by the social media system and, subsequently, analyzed by the targeted messaging system or the social media system sending the interaction data directly to the targeted messaging system.

When the recipient has not interacted with the targeted message body, either by choice or design (i.e., the message body does not contain an interactive element), flow of method 200 can return to step 215 where the targeted messaging system can continue to monitor the social media system. When the recipient interacts with the targeted message body, the targeted messaging system can determine if a product/service provider is involved with the interaction in step 235.

When a product/service provider is involved with the message body interaction, step 240 can be run where the targeted messaging system can provide the recipient with the indicated product/service provider information. Alternately, provision of the product/service provider information of step 240 can be handled by the social media system user interface.

When a product/service provider is not involved in the message body interaction or upon completion of step 240, the targeted messaging system can collect metrics data about the presentation of and/or interaction with the targeted message in step 245. In step 250, the targeted messaging system can generate and distribute reports based upon the metrics data, as requested.

Depending upon implementation, step 240 can be performed asynchronously with relation to the recipient's interaction with the targeted message. For example, the targeted messaging system can be configured to collect metrics data from the social media system on a once a week schedule.

Figure 3:
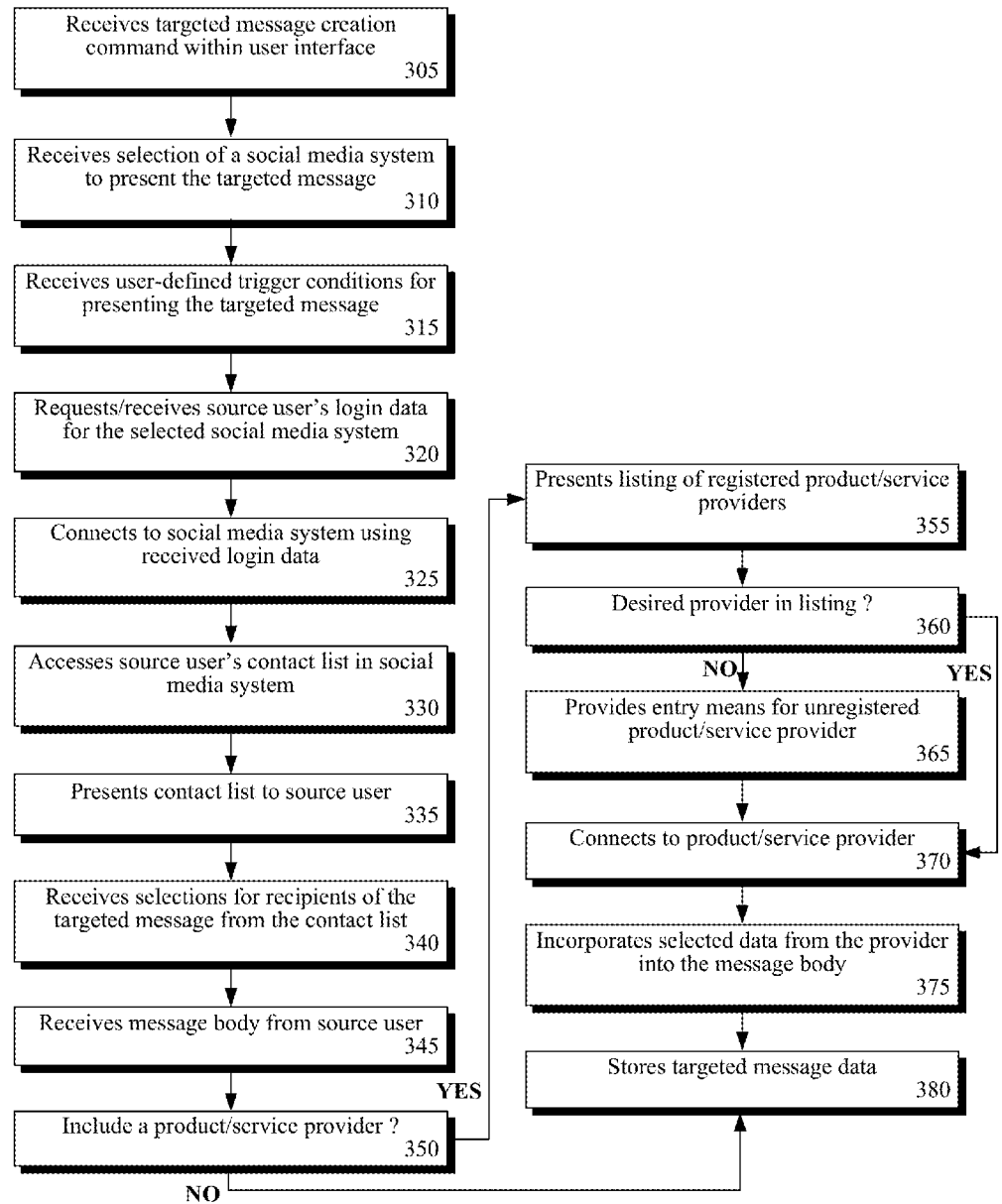
FIG. 3 is a flowchart of a method describing an example operation of the targeted messaging system in accordance with an embodiment of the inventive arrangements disclosed herein.

FIG. 3 is a flowchart of a method 300 describing an example operation of the targeted messaging system in accordance with embodiments of the inventive arrangements disclosed herein. Method 300 can be performed within the context of system 100 and/or in conjunction with method 200.

Method 300 can begin in step 305 where the targeted messaging system can receive a command to create a targeted message within the user interface of the targeted messaging system. The selection of a social media system in which to present the targeted message can be received in step 310. In step 315, the user-defined trigger conditions for presenting the targeted message can be received.

Login data for the selected social media system can be requested and received in step 320. Step 320 can be bypassed in future performances of method 300 if the targeted messaging system is configured to store the source user's login data as part of their user data. In step 325, the targeted messaging system can connect to the selected social media system using the received login data.

The source user's contact list in the social media system can be accessed in step 330. In step 335, the contact list can be presented to the source user. Selections for recipients of the targeted message can be received in step 340; the selections can be made from the presented contact list.

In step 345, the message body of the targeted message can be received from the source user. The targeted messaging system can determine if the message body is to include information from a product/service provider in step 350. When the message body is not to include information from a product/service provider, step 380 can be performed where the targeted message data is stored, completing the creation process.

When information from a product/service provider is to be included in the message body, step 355 can be performed where the source user can be presented with a listing of registered product/service providers. It should be noted that the registering of product/service providers with the targeted messaging system need not be required, but is included here for illustrative purposes.

In step 360, the targeted messaging system can receive feedback from the source user indicating whether the desired product/service provider is contained in the listing. When the desired product/service provider is not contained in the listing, the means for including an unregistered product/service provider can be provided to the source user in step 365.

When the desired product/service provider is contained in the listing or upon completion of step 365, the targeted messaging system can connect to the selected product/service provider in step 370. In step 375, the selected data from the product/service provider can be incorporated into the message body. The targeted message data can then be stored in step 380, completing the creation process.

Figure 4:
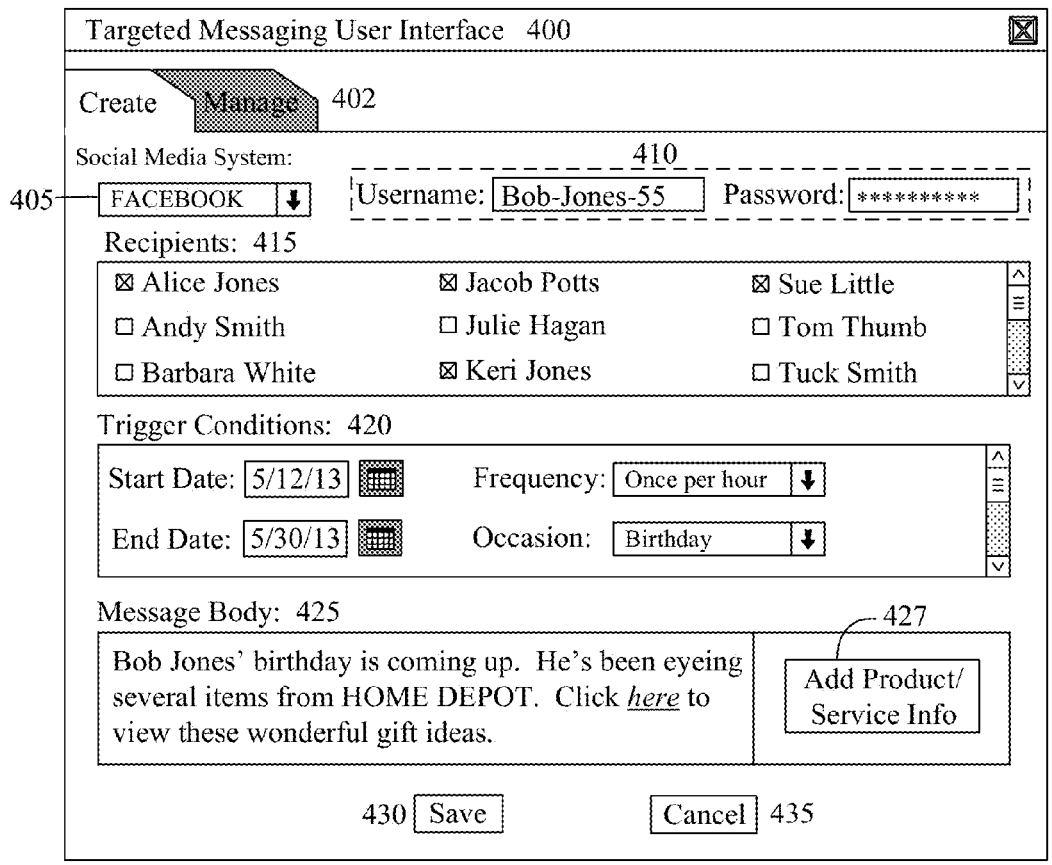
FIG. 4 is an illustration of an example user interface for the targeted messaging system in accordance with embodiments of the inventive arrangements disclosed herein.

FIG. 4 is an illustration of an example user interface 400 for the targeted messaging system in accordance with embodiments of the inventive arrangements disclosed herein. User interface 400 can be utilized within the context of system 100 and/or methods 200 and/or 300.

In this example, the user interface 400 can provide the source user with the means to perform functions pertaining to targeted messages; these functions can be indicated by the tabs 402 representing "Create" and "Manage" functions. The active tab 402, in this example, can provide the source user with the ability to create a targeted message.

The Create tab 402 can include data entry mechanisms for defining the social media system 405 to be used as the delivery vehicle for the targeted message, the recipients 415 of the targeted message, the trigger conditions 420 for presenting the targeted message, and the message body 425 of the targeted message. Additionally, the Create tab 402 can include a save button 430 for storing the targeted message data and a cancel button 435 to discard the entered targeted message data.

The source user can select a social media system 405 from a list or drop-down menu. The selected social media system 405 can be expected to present the targeted message (i.e., how the targeted message will be presented). Selection of the social media system 405 can require the source user to input login data 410 so the targeted messaging system can access the source user's contact list, as explained in method 200.

The source user's contact list from the selected social media system 405 can be presented as a selectable set of recipients 415 within the user interface 400. Selected recipients 415 can be the "targets" of the targeted message (i.e., who the targeted message will be presented). In the trigger conditions 420 area, the source user can enter values for various data fields that influence the delivery and/or presentation of the targeted message (i.e., when the targeted message will be presented).

The message body 425 area of the user interface 400 can represent the means by which the source user can enter the content of the targeted message (i.e., what the targeted message presents). In this example, the message body 425 area can be a text box, allowing free-form text input from the source user. In other contemplated embodiments, the message body 425 area of the user interface 400 can be designed to utilize a variety of selectable, predefined messages and/or phrases, in order to limit potential abuse of the targeted messaging system.

The message body 425 area can include means to allow the source user to add information from an external product/service provider, as illustrated by add button 427. In this example, selection of the add button 427 can present the source user with a floating or pop-up window in which the product/service provider can be identified.

For example, such a pop-up window can be a Web browser that the source user can use to navigate to the Web page of the product or service that they would like to highlight in the contents of the message body 425. The targeted messaging system can then incorporate a hyperlink to the navigated Web page in the message body 425.

Figure 4A:
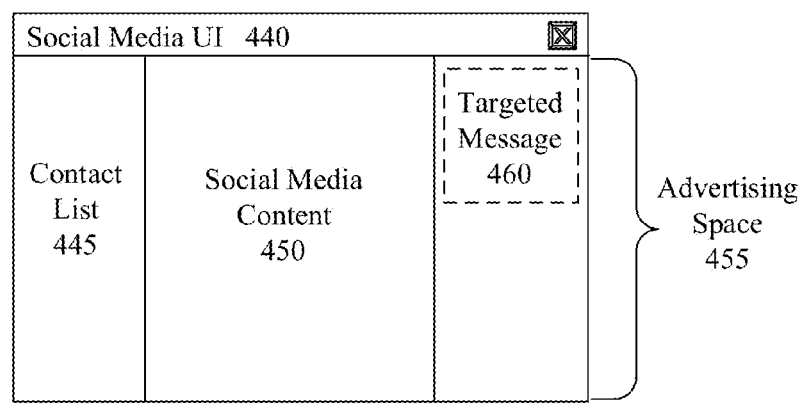
FIG. 4A is a schematic diagram illustrating the presentation of a targeted message within the user interface of a social media system in accordance with embodiments of the inventive arrangements disclosed herein.

Based upon the information entered within the user interface 400, the contents of the message body 425 can be displayed within the social media user interface 440 when the trigger conditions 420 have been met, as illustrated in FIG. 4A. A typical, Web-based social media user interface 440 can include an area that displays the user's contact list 445, the social media content 450 that is applicable to the user, and an area used as advertising space 455. The message body 425 can be presented to the user (targeted recipient) as the targeted message 460 within the advertising space 455 of the social media user interface 440, allowing the targeted message 460 to blend-in with other advertisements.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for electronically providing targeted messages comprising:
   receiving of a plurality of data items that define a targeted message that is to be presented within a social media context by a source-concealing targeted messaging system, wherein the plurality of data items are provided by a source user of the source-concealing targeted messaging system, wherein said plurality of data items comprises at least a set of at least one recipient, a message body, and a set of at least one trigger condition indicating when the targeted message is to be presented to the set of at least one recipient, wherein the source user and the set of at least one recipient are members of a social media system providing the social media context, wherein the at least one recipient is a member of a contact list of the source user within the social media system, wherein the message body contains a hyperlink that, responsive to being selected by the at least one recipient, accesses a wish list of the source user from a web page and displays the wish list of the source user, wherein receiving of the plurality of data items comprises:
     receiving via a provided input mechanism a command to include the hyperlink to access the wish list from an external data source within the message body;
     checking a validity of the hyperlink to access the wish list; and
     when the hyperlink to access the wish list is determined to be valid, incorporating the hyperlink to access the wish list into the message body;
   monitoring the at least one trigger condition of the targeted message for satisfaction and the social media system for presence of the at least one recipient; and
   when the at least one trigger condition is satisfied and a recipient contained in the set of at least one recipient is currently active within the social media system, presenting the message body of the targeted message, including the hyperlink that, responsive to being selected by the at least one recipient, accesses the wish list of the source user from the web page and displays the wish list of the source user, to the recipient within a user interface of the social media system, wherein an affiliation of the source user with the targeted message is concealed from the recipient in said presentation;
   wherein the targeted messaging system determines whether the recipient has interacted with the hyperlink that, responsive to being selected by the at least one recipient, accesses the wish list of the source user from the web page and displays the wish list of the source user, responsive to identifying that the recipient has interacted with the hyperlink that, responsive to being selected by the at least one recipient, accesses the wish list of the source user from the web page and displays the wish list of the source user, determines whether a product or service provider is involved with the interaction and, responsive to determining that the product or service provider is involved with the interaction, provides the recipient with information of the product or service provider.

2. The method of claim 1, wherein receiving of the plurality of data items further comprises:
   receiving a selection of the social media system to be used for the social media context;
   requesting and receiving login data for the social media system from the source user;
   establishing a communications pathway with the social media system using the received login data;
   accessing the contact list of the source user; and
   presenting the contact list within a user interface of the source-concealing targeted messaging system, wherein the set of at least one recipient is selected by the source user from the presented contact list.

3. The method of claim 1, wherein the external data source is an online provider of a product or a service, wherein said reference is at least one of a Web page depicting the product or service and a data collection of at least one product or service previously selected by the source user.

4. The method of claim 1, further comprising:
   aggregating metrics data regarding interactions of the set of at least one recipient with the targeted message; and
   generating a variety of reports based upon the aggregated metrics data.

5. The method of claim 1, wherein the wish list of the source user is a wish list for a particular online shopping site.

6. The method of claim 1, further comprising:
   collecting data pertaining to interaction of the recipient with the hyperlink that, responsive to being selected by the at least one recipient, accesses the wish list of the source user from the web page and displays the wish list of the source user;
   producing a report pertaining to the interaction of the recipient with the hyperlink that, responsive to being selected by the at least one recipient, accesses the wish list of the source user from the web page and displays the wish list of the source user; and communicating to the source user the report pertaining to the interaction of the recipient with the hyperlink that, responsive to being selected by the at least one recipient, accesses the wish list of the source user from the web page and displays the wish list of the source user.

7. A system for electronically providing targeted messages comprising:
one or more non-transitory storage mediums comprising program instructions;
one or more processors operable to execute the program instructions to initiate executable operations comprising;
receiving of a plurality of data items that define a targeted message that is to be presented within a social media context by a source-concealing targeted messaging system, wherein the plurality of data items are provided by a source user of the source-concealing targeted messaging system, wherein said plurality of data items comprises at least a set of at least one recipient, a message body, and a set of at least one trigger condition indicating when the targeted message is to be presented to the set of at least one recipient, wherein the source user and the set of at least one recipient are members of a social media system providing the social media context, wherein the at least one recipient is a member of a contact list of the source user within the social media system, wherein the message body contains a hyperlink that, responsive to being selected by the at least one recipient, accesses a wish list of the source user from a web page and displays the wish list of the source user, wherein receiving of the plurality of data items comprises:
receiving via a provided input mechanism a command to include the hyperlink to access the wish list from an external data source within the message body;
checking a validity of the hyperlink to access the wish list; and
when the hyperlink to access the wish list is determined to be valid, incorporating the hyperlink to access the wish list into the message body;
monitoring the at least one trigger condition of the targeted message for satisfaction and the social media system for presence of the at least one recipient; and
when the at least one trigger condition is satisfied and a recipient contained in the set of at least one recipient is currently active within the social media system, presenting the message body of the targeted message, including the hyperlink that, responsive to being selected by the at least one recipient, accesses the wish list of the source user from the web page and displays the wish list of the source user, to the recipient within a user interface of the social media system, wherein an affiliation of the source user with the targeted message is concealed from the recipient in said presentation;
wherein the targeted messaging system determines whether the recipient has interacted with the hyperlink that, responsive to being selected by the at least one recipient, accesses the wish list of the source user from the web page and displays the wish list of the source user, responsive to identifying that the recipient has interacted with the hyperlink that, responsive to being selected by the at least one recipient, accesses the wish list of the source user from the web page and displays the wish list of the source user, determines whether a product or service provider is involved with the interaction and, responsive to determining that the product or service provider is involved with the interaction, provides the recipient with information of the product or service provider.

8. The system of claim 7, wherein the wherein receiving of the plurality of data items further comprises:
receiving a selection of the social media system to be used for the social media context;
requesting and receiving login data for the social media system from the source user;
establishing a communications pathway with the social media system using the received login data;
accessing the contact list of the source user; and
presenting the contact list within a user interface of the source-concealing targeted messaging system, wherein the set of at least one recipient is selected by the source user from the presented contact list.

9. The system of claim 7, wherein the external data source is an online provider of a product or a service, wherein said reference is at least one of a Web page depicting the product or service and a data collection of at least one product or service previously selected by the source user.

10. The system of claim 7, the executable operations further comprising:
aggregating metrics data regarding interactions of the set of at least one recipient with the targeted message; and
generating a variety of reports based upon the aggregated metrics data.

11. The system of claim 7, the executable operations further comprising:
collecting data pertaining to interaction of the recipient with the hyperlink that, responsive to being selected by the at least one recipient, accesses the wish list of the source user from the web page and displays the wish list of the source user;
producing a report pertaining to the interaction of the recipient with the hyperlink that, responsive to being selected by the at least one recipient, accesses the wish list of the source user from the web page and displays the wish list of the source user; and
communicating to the source user the report pertaining to the interaction of the recipient with the hyperlink that, responsive to being selected by the at least one recipient, accesses the wish list of the source user from the web page and displays the wish list of the source user.

12. A computer program product comprising a non-transitory computer readable storage medium having computer usable program code embodied therewith, the computer usable program code comprising:
computer usable program code, stored in the non-transitory computer readable storage medium, configured to receive a plurality of data items that define a targeted message that is to be presented within a social media context, wherein the plurality of data items are provided by a source user, wherein said plurality of data items comprises at least a set of at least one recipient, a message body, and a set of at least one trigger condition indicating when the targeted message is to be presented to the set of at least one recipient, wherein the source user and the set of at least one recipient are members of a social media system providing the social media context, wherein the at least one recipient is a member of a contact list of the source user within the social media system, wherein the message body contains a hyperlink that, responsive to being selected by the at least one recipient, accesses a wish list of the source user from a web page and displays the wish list of the source user, wherein the computer usable program code configured to receive the plurality of data items comprises: computer usable program code configured to receive via a provided input mechanism a command to include a reference to information from an external data source within the message body; computer usable program code configured to check a validity of the reference; and computer usable program code configured to, when the reference is determined to be valid, incorporate the reference into the message body;

with wherein receiving of the plurality of data items comprises: receiving via a provided input mechanism a command to include the hyperlink to access the wish list from an external data source within the message body; checking a validity of the hyperlink to access the wish list; and when the hyperlink to access the wish list is determined to be valid, incorporating the hyperlink to access the wish list into the message body;

computer usable program code, stored in the non-transitory computer readable storage medium, configured to monitor the at least one trigger condition of the targeted message for satisfaction and the social media system for presence of the at least one recipient; and computer usable program code, stored in the non-transitory computer readable storage medium, configured to, when the at least one trigger condition is satisfied and a recipient contained in the set of at least one recipient is currently active within the social media system, present the message body of the targeted message, including the hyperlink that, responsive to being selected by the at least one recipient, accesses the wish list of the source user from the web page and displays the wish list of the source user, to the recipient within a user interface of the social media system, wherein an affiliation of the source user with the targeted message is concealed from the recipient in said presentation;

wherein the targeted messaging system determines whether the recipient has interacted with the hyperlink that, responsive to being selected by the at least one recipient, accesses the wish list of the source user from the web page and displays the wish list of the source user, responsive to identifying that the recipient has interacted with the hyperlink that, responsive to being selected by the at least one recipient, accesses the wish list of the source user from the web page and displays the wish list of the source user, determines whether a product or service provider is involved with the interaction and, responsive to determining that the product or service provider is involved with the interaction, provides the recipient with information of the product or service provider.

13. The computer program product of claim 12, wherein receiving of the plurality of data items further comprises:

computer usable program code configured to receive a selection of the social media system to be used for the social media context;

computer usable program code configured to request and receive login data for the social media system from the source user;

computer usable program code configured to establish a communications pathway with the social media system using the received login data;

computer usable program code configured to access the contact list of the source user; and computer usable program code configured to present the contact list within a user interface of the source-concealing targeted messaging system, wherein the set of at least one recipient is selected by the source user from the presented contact list.

14. The computer program product of claim 12, further comprising:

computer usable program code, stored in the non-transitory computer readable storage medium, configured to collect data pertaining to interaction of the recipient with the hyperlink that, responsive to being selected by the at least one recipient, accesses the wish list of the source user from the web page and displays the wish list of the source user, produce a report pertaining to the interaction of the recipient with the hyperlink that, responsive to being selected by the at least one recipient, accesses the wish list of the source user from the web page and displays the wish list of the source user, and communicate to the source user the report pertaining to the interaction of the recipient with the hyperlink that, responsive to being selected by the at least one recipient, accesses the wish list of the source user from the web page and displays the wish list of the source user.

* * * * *